US006999636B1

(12) United States Patent
Enokida et al.

(10) Patent No.: US 6,999,636 B1
(45) Date of Patent: Feb. 14, 2006

(54) IMAGE SEARCH METHOD AND APPARATUS

(75) Inventors: Miyuki Enokida, Kanagawa (JP); Kentaro Matsumoto, Tokyo (JP); Kunihiro Yamamoto, Kanagawa (JP); Kiyoshi Kusama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 646 days.

(21) Appl. No.: 09/707,050

(22) Filed: Nov. 6, 2000

(30) Foreign Application Priority Data

| | | | |
|---|---|---|---|
| Nov. 9, 1999 | (JP) | | 11-318880 |
| Nov. 12, 1999 | (JP) | | 11-323196 |

(51) Int. Cl.
*G06K 9/54* (2006.01)
*G06K 9/60* (2006.01)

(52) U.S. Cl. .......... 382/305

(58) Field of Classification Search .......... 382/305, 382/220; 358/463; 767/6
See application file for complete search history.

(56) References Cited

U.S. PATENT DOCUMENTS

| | | | | |
|---|---|---|---|---|
| 6,246,804 | B1 * | 6/2001 | Sato et al. | 382/284 |
| 6,310,971 | B1 * | 10/2001 | Shiiyama | 382/181 |
| 6,345,274 | B1 * | 2/2002 | Zhu et al. | 707/5 |
| 6,373,979 | B1 * | 4/2002 | Wang | 382/165 |
| 6,400,853 | B1 * | 6/2002 | Shiiyama | 382/305 |
| 6,445,818 | B1 * | 9/2002 | Kim et al. | 382/165 |
| 6,463,426 | B1 * | 10/2002 | Lipson et al. | 707/3 |
| 6,522,782 | B2 * | 2/2003 | Pass et al. | 382/218 |
| 6,564,206 | B1 * | 5/2003 | Ikeda | 707/3 |
| 6,621,926 | B1 * | 9/2003 | Yoon et al. | 382/168 |
| 6,628,824 | B1 * | 9/2003 | Belanger | 382/165 |

* cited by examiner

*Primary Examiner*—Samir Ahmed
*Assistant Examiner*—Brian Le
(74) *Attorney, Agent, or Firm*—Cowan, Liebowitz & Latman, P.C.

(57) ABSTRACT

In searching for a desired image from an external storage device which stores a plurality of images, similarity between a designated search source image and each of the plurality of images is calculated on the basis of the feature amount of the designated search source image and the feature amounts of the plurality of images. A similar image is extracted from the plurality of images on the basis of the calculated image similarity. In calculating the similarity, an image is segmented into a plurality of regions, different weights are set for the respective regions, and the similarity is calculated using the set weights.

18 Claims, 14 Drawing Sheets

IMAGE SEARCH METHOD AND APPARATUS

FIELD OF THE INVENTION

The present invention relates to an image search method and apparatus for searching for desired image data from a plurality of image data, and a medium.

BACKGROUND OF THE INVENTION

Various means for searching for a desired image from an image database in which a plurality of image data are stored have been proposed. Search processing methods of this type are roughly classified into:

- methods of linking nonimage information such as a keyword or image sensing date and time to image data and executing search on the basis of it, and
- methods of executing search on the basis of a feature amount (information such as luminance/color difference information, image frequency, or histogram) of an image itself.

In the latter methods, a method of presenting an image to an image database and searching for an image using the feature amount of the image as a search key is particularly called similar image search. It has an advantage that an intuitively understandable search interface can be provided to a user who has no special knowledge about image processing.

This similar image search is sometimes executed on the basis of, e.g., the user's memory or an image idea uniquely presented by the user. Such a method is particularly effective when the user has no image data serving as a search key. However, similar image search based on such a manually drawn image is difficult with the above-described user interface of similar image search.

The user is also forced to do a cumbersome operation of, e.g., selecting a candidate image by the above-described keyword search and executing similar image search using the image obtained by this method as a key image.

In addition, in executing similar image search by "manually" drawing an image that the user remembers and using this image as a key image, a problem arises due to the fact that the human memory is ambiguous. Especially, for "colors", a person often remembers only characteristic colors, and also often remembers colors such as "red" close to primary colors.

For this reason, even when the colors (RGB) of a manually drawn image are directly used as image search keys, it is often difficult to search for an image desired by the user. That is, in executing search using a manually drawn image as an original image, the user interface of similar image search is hard to use or unusable.

SUMMARY OF THE INVENTION

The present invention has been made in consideration of the above-described problems, and has as its object to enable similar image search while accurately reflecting the user's intention.

In order to achieve the above object, according to the present invention, there is provided an image search method of searching for a desired image from a plurality of images stored in storage means, comprising the setting step of setting a weight value in correspondence with a property of feature amount used in similarity calculation of the image, the calculation step of calculating similarity between a designated search source image and each of the plurality of images on the basis of a feature amount of the designated search source image, a feature amount of each of the plurality of images, and the weight value set in the setting step, and the acquisition step of acquiring an image as a search result from the plurality of images on the basis of the image similarity calculated in the calculation step.

According to the present invention, there is also provided an image search apparatus for searching for a desired image from a plurality of images stored in storage means, comprising setting means for setting a weight value in correspondence with a property of feature amount used in similarity calculation of the image, calculation means for calculating similarity between a designated search source image and each of the plurality of images on the basis of a feature amount of the designated search source image, a feature amount of each of the plurality of images, and the weight value set by the setting means, and acquisition means for acquiring an image as a search result from the plurality of images on the basis of the image similarity calculated by the calculation means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
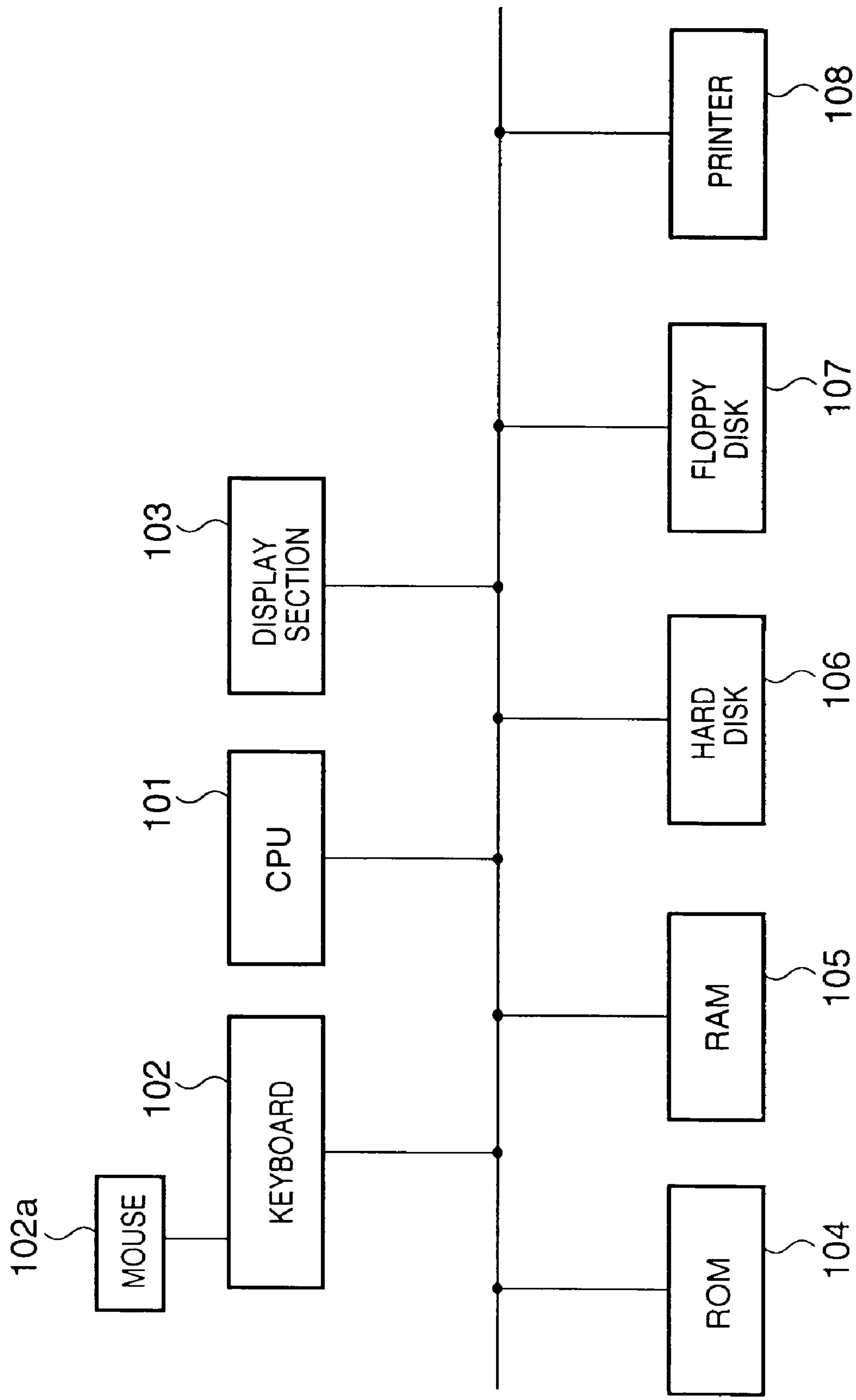
FIG. 1 is a block diagram showing the arrangement of an image search apparatus according to the first embodiment.

FIG. 1 is a block diagram showing the arrangement of an image search apparatus (computer system) according to the first embodiment.

Referring to FIG. 1, a CPU 101 controls the entire system. A keyboard 102 is used to input a user's instruction operation to the system together with a mouse 102*a*. A display section 103 is constructed by a CRT or liquid crystal panel. A ROM 104 and RAM 105 constitute the storage device of the system and store a program to be executed by the CPU 101 or data to be used by the system. A hard disk device 106 and floppy disk device 107 constitute an external storage device used by the file system of the system. Image data as a target of search processing (to be described later) is stored in this external storage device. Reference numeral 108 denotes a printer.

Figure 2:
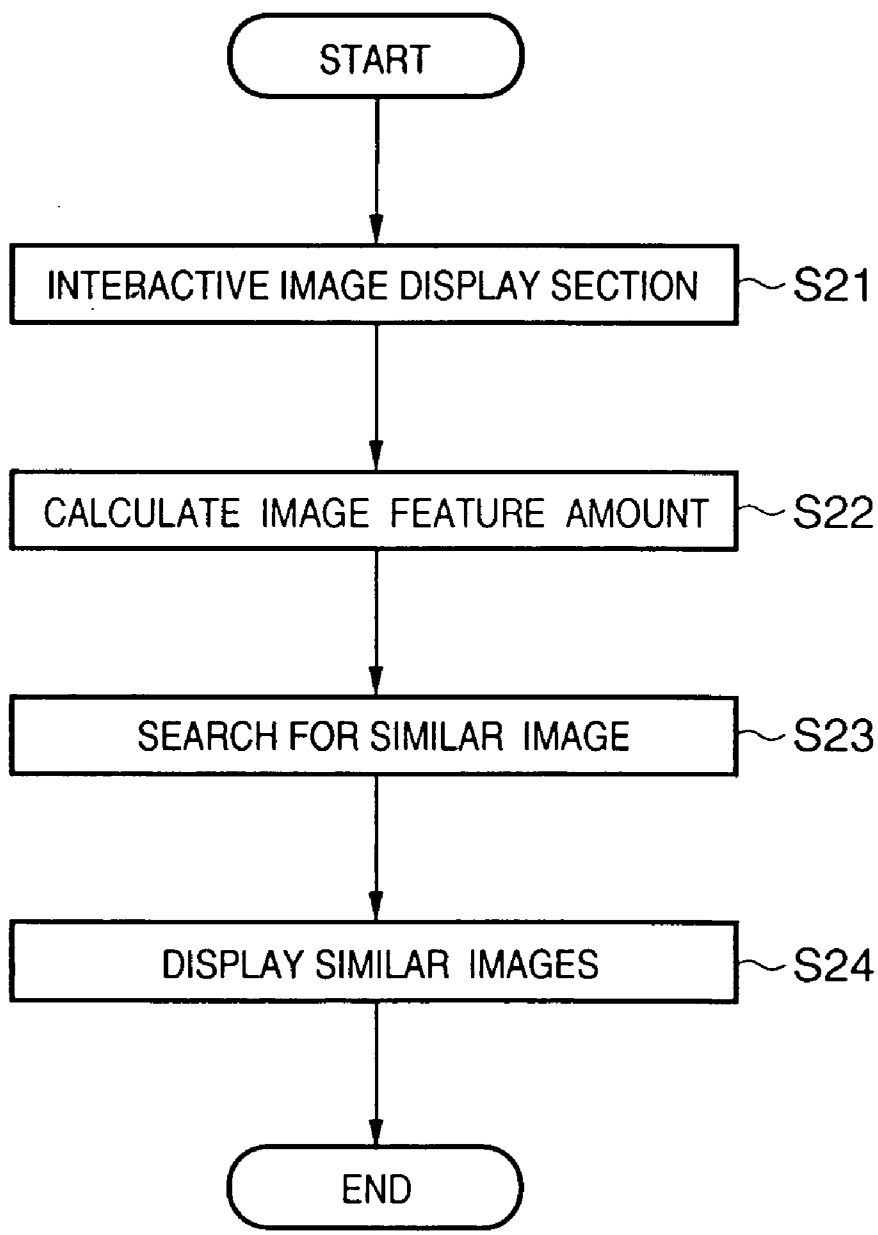
FIG. 2 is a flowchart showing the schematic flow of image search according to the first embodiment.

FIG. 2 is a flowchart showing the schematic flow of image search according to the first embodiment. In step S21, the user draws an illustration similar to the desired image on the display section 103. In step S22, the feature amount of the drawn image is calculated. In step S23, a similar image is searched on the basis of the feature amount. In step S24, similar image data obtained by the search is displayed on the display section 103. Each of these steps will be described below in detail.

<Description of Step S21>

Figure 3:
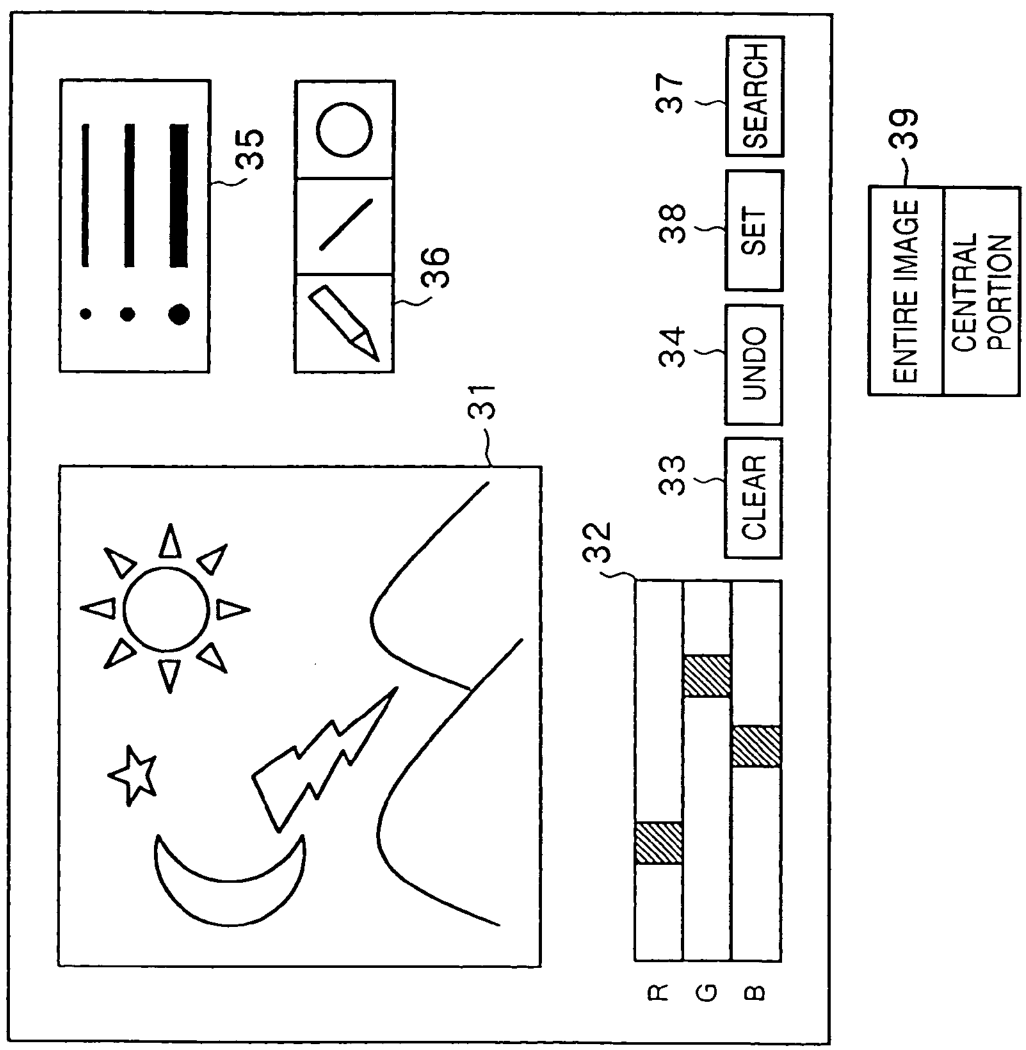
FIG. 3 is a view showing an operation window displayed on a display section 103 in step S21.

FIG. 3 is a view showing an operation window displayed on the display section 103 in step S21. Reference numeral 31 denotes a user drawing region; 32, color designation scroll bars; 33, a clear button; 34, an undo button; 35, radio buttons used to designate the line width of a pen; 36, tool pallet buttons; 37, a search execution button, and 38, a set button used to set a condition for the search.

The user can draw an illustration similar to the image to be searched in the user drawing region 31 using the mouse 102*a*, the drawing tools realized by software, and the like. The outline of operations of the drawing tools used to draw an illustration will be described below.

The color designation scroll bars 32 are used to designate the color of a pen to be used for drawing. R, G, and B values are designated sequentially from the upper side. When the clear button 33 is pressed, the entire drawing region 31 is made white to initialize the drawing region 31. When the undo button 34 is pressed, the immediately preceding drawing operation is canceled to restore the previous state. The line width of the pen to be used for drawing in the drawing region 31 can be designated using the radio buttons 35. When the left "pen" button of the tool pallet 36 is selected, the user can draw a free line on the drawing region 31 using the pointing device 102*a*. When the central "straight line" button of the tool pallet 36 is selected, a straight line can be drawn by designating the start and end points of the straight line using the pointing device 102*a*. When the right "circle" button of the tool pallet 36 is selected, a circle can be drawn by designating the center and radius of the circle, like the "pen" or "straight line" button.

When an illustration is drawn in the drawing region 31 using the above drawing tools, and the search execution button 37 is pressed, processing advances from step S21 to step S22.

Before pressing the search execution button 37, a similar image search condition for processing from step S22 can be changed by operating the set button 38. More specifically, when the user presses the set button 38, a setting menu 39 is displayed in which, for calculation of similarity in similar image search, "a uniform weight for the entire image (entire image)" or "an increased weight for the central portion of the image (central portion)" can be selected.

<Description of Step S22>

Figure 4:
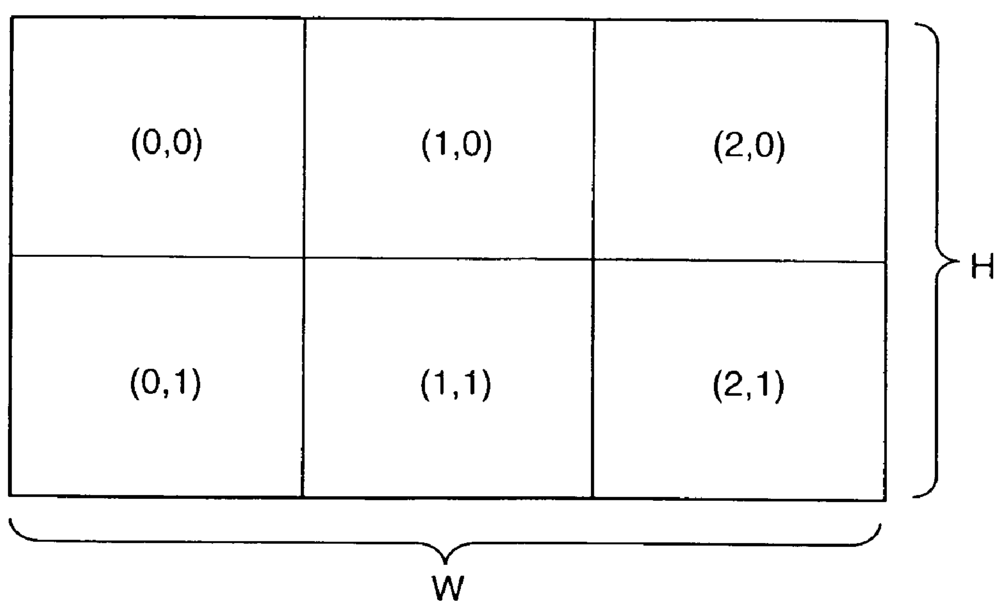
FIG. 4 is a view for explaining an image segmented state in the first embodiment.

In step S22, the image feature amount of the illustration is calculated. In this embodiment, the image is segmented into a predetermined number of regions, feature amounts are calculated in units of regions, and the similarity is calculated using these feature amounts. FIG. 4 is a view for explaining an image segmented state in the first embodiment. As shown in FIG. 4, the size of the drawing region 31 is W pixels (horizontal)×H pixels (vertical). In this embodiment, this region is segmented into three parts in the horizontal direction and two parts in the vertical direction, i.e., a total of six parts, which are represented as region (0, 0), . . . , region (2, 1) sequentially from the upper left corner. The average values of R, G, and B values in each region are calculated, so a total of 18 numerical values are used as image feature amounts of the illustration.

Figure 5:
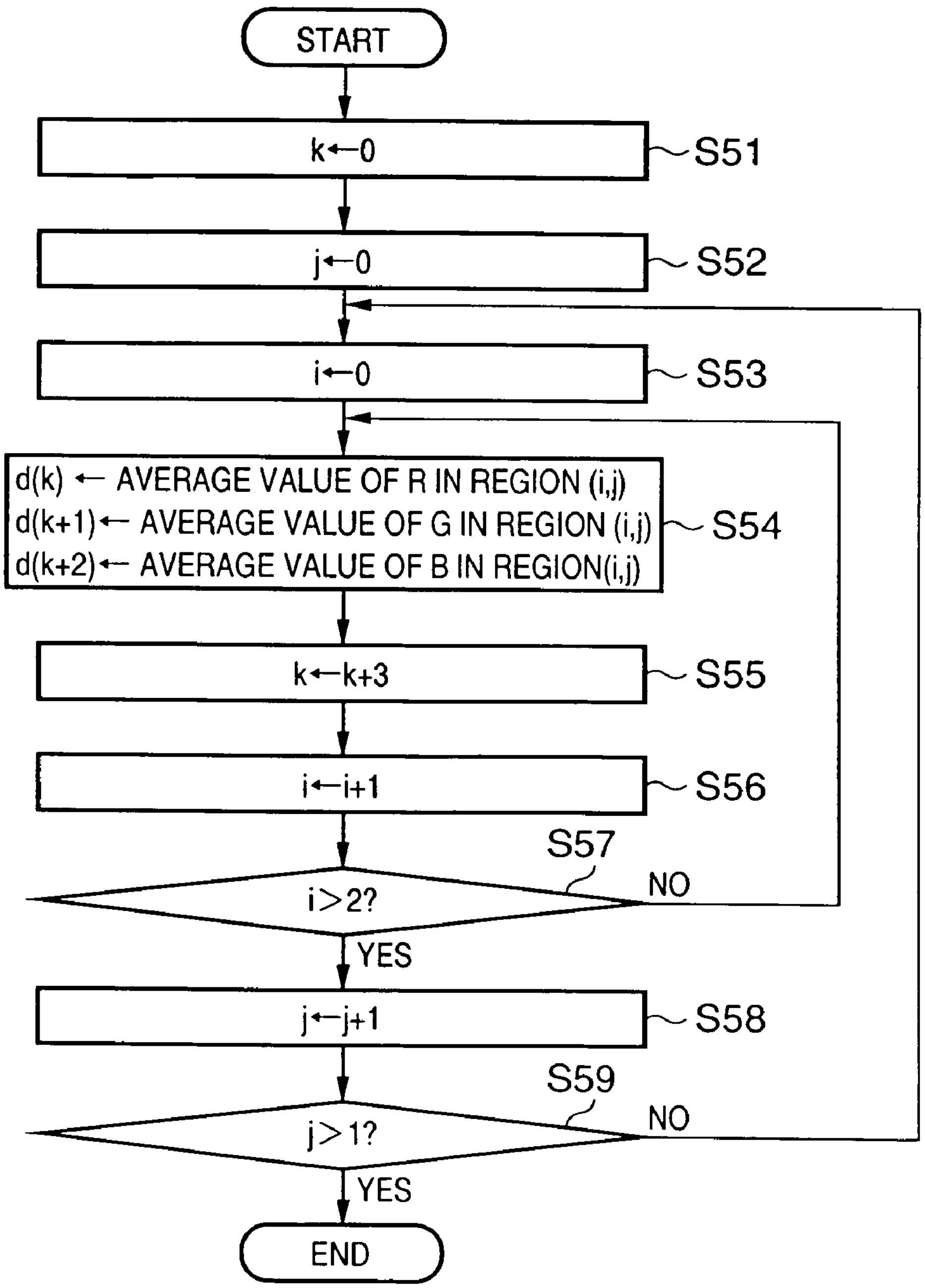
FIG. 5 is a flowchart for explaining image feature amount calculation processing according to the first embodiment.

FIG. 5 is a flowchart for explaining image feature amount calculation processing according to the first embodiment. The flow of feature amount calculation processing will be described with reference to the flowchart shown in FIG. 5. In step S51, a variable k is initialized to value "0". In step S52, a variable j is initialized to value "0". In step S53, a variable i is initialized to value "0". In step S54, the average value of R values in a region (i, j) is substituted into a kth element d(k) of an array d. In a similar manner, the average value of G values and the average value of B values are substituted into elements d(k+1) and d(k+2), respectively. The method of calculating the average values of the R, G, and B values will be described later using the flowchart shown in FIG. 6.

In step S55, the variable k is incremented by three. In step S56, the variable i is incremented by one. In step S57, the variable i is compared with value "2". If the variable i is larger than "2", the flow advances to step S58. Otherwise, the flow returns to step S54. In step S58, the variable j is incremented by one. In step S59, the variable j is compared with value "1". If the variable j is larger than "1", the processing is ended. Otherwise, the flow returns to step S53.

When the above processing is ended, the image feature amounts of the illustration are stored in an array d( ) having 18 elements. In this case, to calculate the feature amounts, the image is segmented into six rectangular regions having the same area. However, the segmentation method is not limited to this. For example, the shape of a region is not limited to a rectangular shape and may be more complex. The number of segments is not limited to six. When the number of segments is increased/decreased, the number of elements of the array for storing the feature amounts is not 18 but increases/decreases in accordance with the number of segments, so the values to be used for determination in steps S57 and S59 also change.

Figure 6:
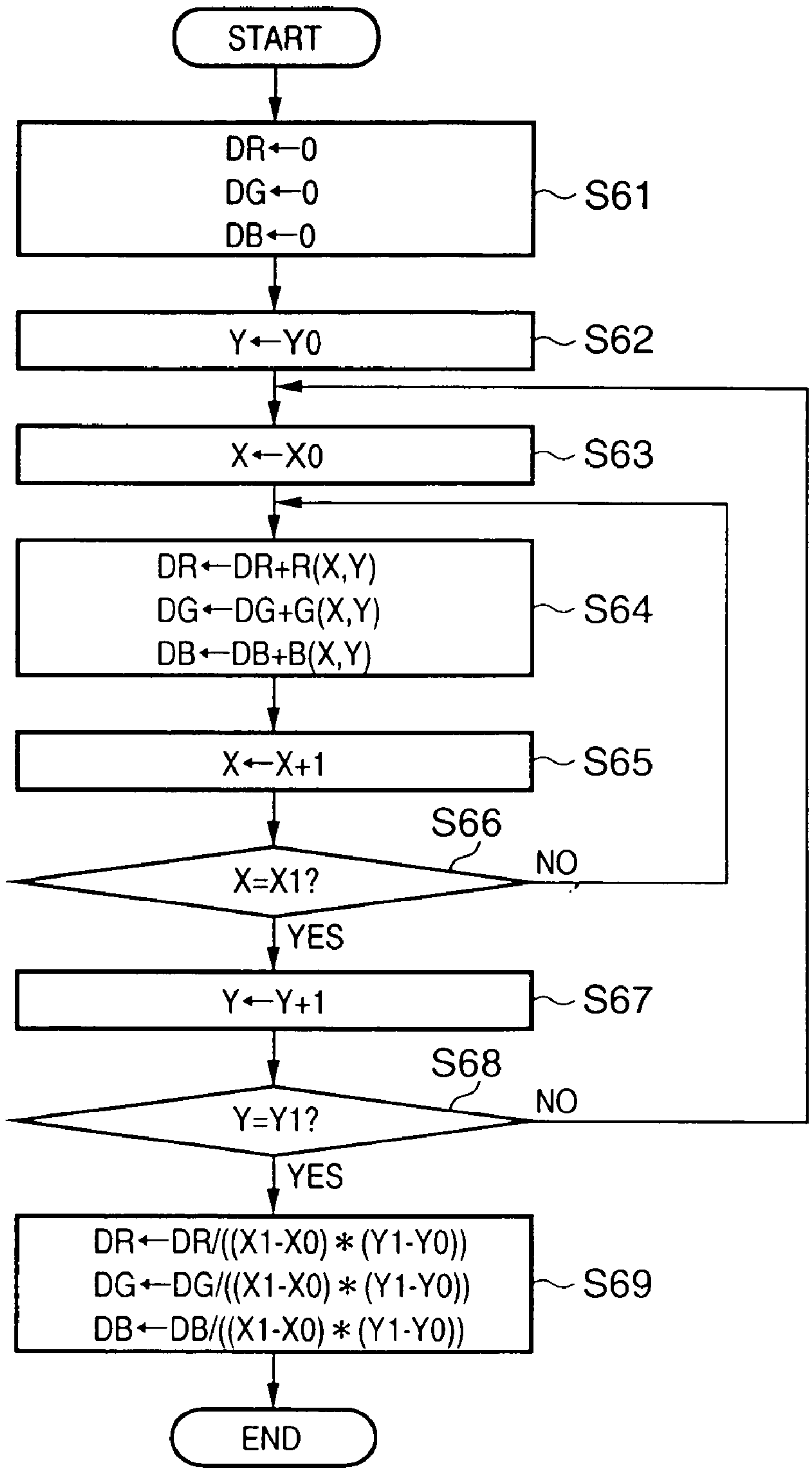
FIG. 6 is a flowchart for explaining a method of calculating the average values of the R, G, and B values in each region.

FIG. 6 is a flowchart for explaining a method of calculating the average values of the R, G, and B values in each region. Assume that the image data is stored in three arrays R(X, Y), G(X, Y), and B(X, Y). In this case, $0 \leqq X < W$, and $0 \leqq Y < H$, and the origin (0, 0) is set at the upper left corner of the image. In the following flow, the average densities in partial regions of $X0 \leqq X < X1$ and $Y0 \leqq Y < Y1$ are calculated, and the average values of R, G, and B values are substituted into variables DR, DG, and DB, respectively.

In step S54, when the image is equally segmented into 3×2, as shown in FIG. 4, the values X0, X1, Y0, and Y1 in the region (i, j) correspond to $$X0 = W \times i/3,\ X1 = W \times (i+1)/3$$

$$Y0 = H \times j/2,\ Y1 = H \times (j+1)/2$$

Hence, after the constants X0, X1, Y0, and Y1 are initialized to the above values, the flowchart shown in FIG. 6 is executed.

First, in step S61, the variables DR, DG, and DB are initialized to value "0". In step S62, the variable Y is initialized to the value Y0. In step S63, the variable X is initialized to the value X0. In step S64, the value R(X, Y) is added to the variable DR. In a similar manner, the values G(X, Y) and B(X, Y) are added to the variables DG and DB, respectively. In step S65, the variable X is incremented by one. In step S66, the variable X is compared to the value X1. If the two values equal, the flow advances to step S67; otherwise, the flow returns to step S64. In step S67, the variable Y is incremented by one. In step S68, the variable Y is compared to the value Y1. If the two values equal, the flow advances to step S69; otherwise, the flow returns to step S63. By repeating steps S63 to S68, the sums of color component values corresponding to all pixels in the region (i, j) are obtained as the values DR, DG, and DB for the R, G, and B color components.

In step S69, each of the values of variables DR, DG, and DB is divided by (X1−X0)×(Y1−Y0), which is the total number of pixels in the region. More specifically, the values DR, DG, and DB are average densities obtained by dividing the sums of pixel densities in the region by the number of pixels.

<Description of Step S23>

In step S23, similar image search is executed on the basis of the above image feature amounts. The hard disk device 106 stores N image data, and the feature amounts of each image are calculated in advance in accordance with the same procedure as described above and stored. The image data can be stored using a standard file format such as JPEG or Flashpix or stored in a so-called RDBMS (Relational DataBase Management System) using a unique format. Assume that image feature amounts are stored in a two-dimensional array D(n, j) having a size of N×18 (n is an image number, and j is a region/color component number; in this embodiment, $0 \leqq n < N$, and $0 \leqq j < 18$). The feature amounts of a drawn image are stored in the array d(j) (j is a region/color component number; $0 \leqq j < 18$). In this embodiment, 0–17 are allocated to the region/color numbers in order such as R, G and B of region (0, 0), R, G and B of region (1, 0) . . . R, G and B of region (2, 1).

An inter-image distance S(n) between a presented image and the nth image is defined by $$S(n) = \sum_i (D(n, i) - d(i))^2$$

It is determined that the similarity is high as the inter-image distance becomes small. First, the inter-image distance S(n) ($0 \leqq n < N$) between the presented image and each of all the N images is calculated, and then M ($0 < M < N$) images are selected sequentially in ascending order of the inter-image distances S(n), thereby executing similar image search. The processing of calculating the inter-image distance S(n) and the processing of selecting M images will be described below with reference to the flow charts in FIGS. 7 and 8, respectively.

Figure 7:
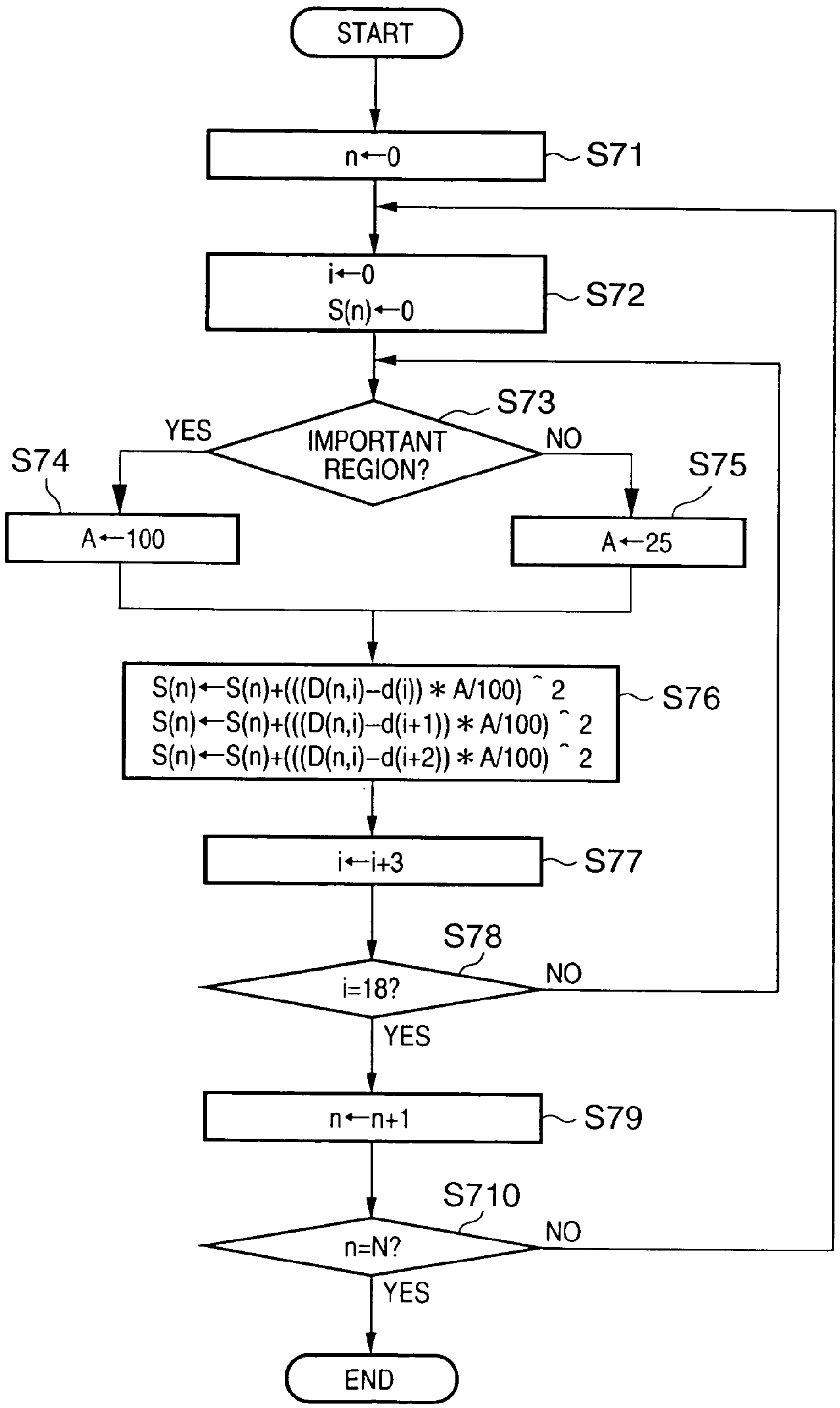
FIG. 7 is a flowchart showing inter-image distance calculation processing according to the first embodiment.
Figure 8:
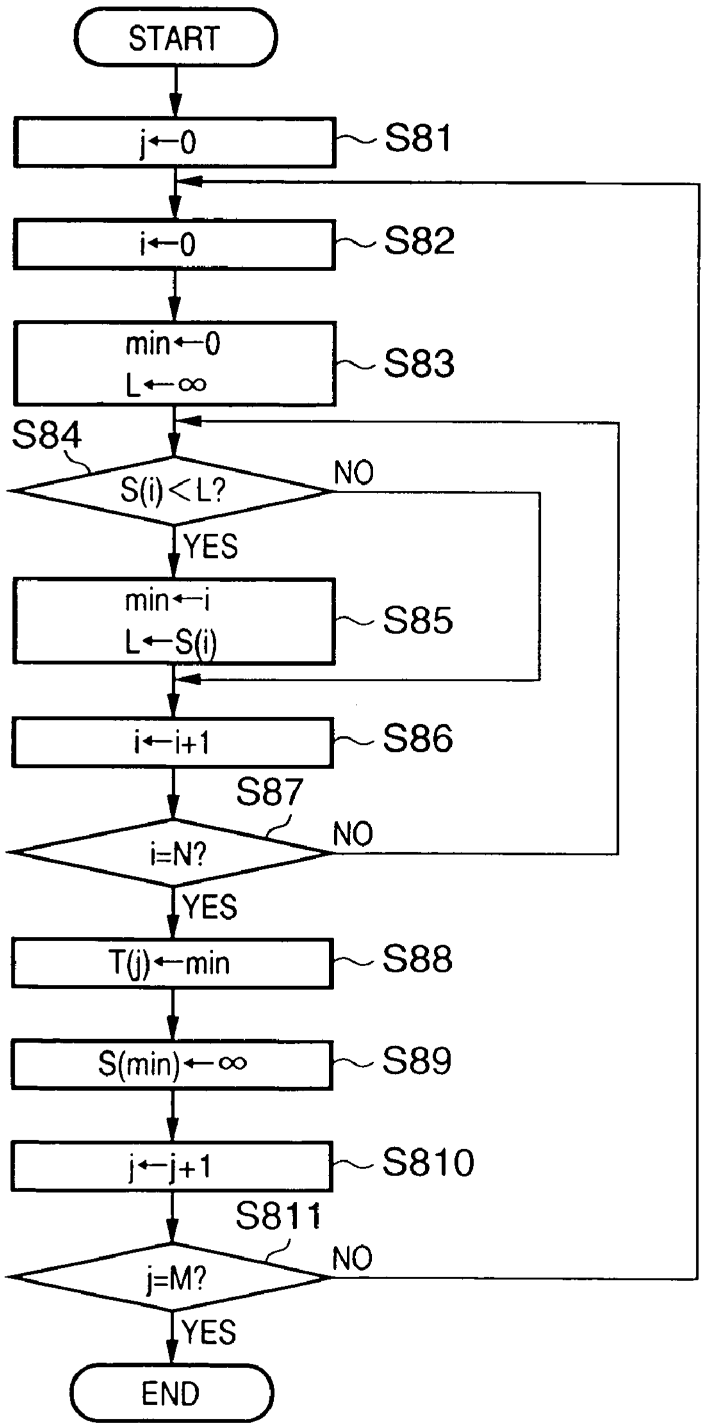
FIG. 8 is a flowchart chart showing processing of selecting a similar image.

Referring to FIG. 7, in step S71, a variable n is initialized to value "0". In step S72, the variable i and inter-image distance S(n) are initialized to value "0".

In step S73, it is determined whether the current region should be regarded as an "important region". As described above, the "entire image" or "central portion" is set as an important region using the setting menu 39. When the "central portion" is set as an important region, the center of the image corresponds to two regions (1, 0) and (1, 1) because the image data is segmented into six regions in extracting the feature amounts, as shown in FIG. 4, in this embodiment. These correspond to region/color component numbers 3 to 5 and 12 to 14. Hence, in step S73, when i=3 and i=12, it is determined that the current region is an important region. When i=3 or i=12, the flow branches to step S74; otherwise, the flow branches to step S75. On the other hand, when the "entire image" is designated as an important region, the flow always branches to step S74.

In step S74, a value "100" is set to a variable A representing a weight. In step S75, a value "25" is set to the variable A. In step S76, the square of the product of A/100 and the difference between D(n, i) and d(i) is added to the value S(n). As a result, the similarity in the important region is multiplied by a weight 100/100, and the similarity in an unimportant region is multiplied by a weight 25/100, thereby reflecting the contents set by the setting menu 39.

In step S77, the variable i is incremented by three. In step S78, the variable i is compared with 18. If the two values equal, the flow advances to step S79; otherwise, the flow returns to step S73. In step S79, the variable n is incremented by one. In step S710, the variable n is compared with the value N. If the two values equal, the processing is ended; otherwise, the flow returns to step S72.

The inter-image distance between the presented image and each of all the stored images is stored in the array S(n) calculated in the above way. The inter-image distance is calculated with a weight corresponding to the "important region" or "unimportant region", as described above. Next, the processing of selecting M images sequentially in ascending order of inter-image distances and storing their image numbers in an array T( ) will be described with reference to FIG. 8.

In step S81, the variable j is initialized to value "0". In step S82, the variable i is initialized to value "0". In step S83, a variable min is initialized to value "0", and a variable L is initialized to a sufficiently large value. In step S84, the value S(i) is compared to the value L. If S(i)<L, the flow advances to step S85; otherwise, the flow advances to step S86.

In step S85, the value i is substituted into the variable min and the value S(i) is substituted into the value L. In step S86, the variable i is incremented by one. In step S87, the variable i is compared with the value N. If the two values equal, the flow advances to step S88; otherwise, the flow returns to step S83. In step S88, the value min is substituted into the array T(j). In step S89, a sufficiently large value is substituted into the value S(min). In step S810, the variable j is incremented by one. In step S811, the variable j is compared with the value M. If the two values equal, the processing is ended; otherwise, the flow returns to step S82. With the above processing, the image numbers are stored in the array T(j) ($0 \leqq j < M$) in descending order of similarities to the presented image.

<Description of Step S24>

Figure 9:
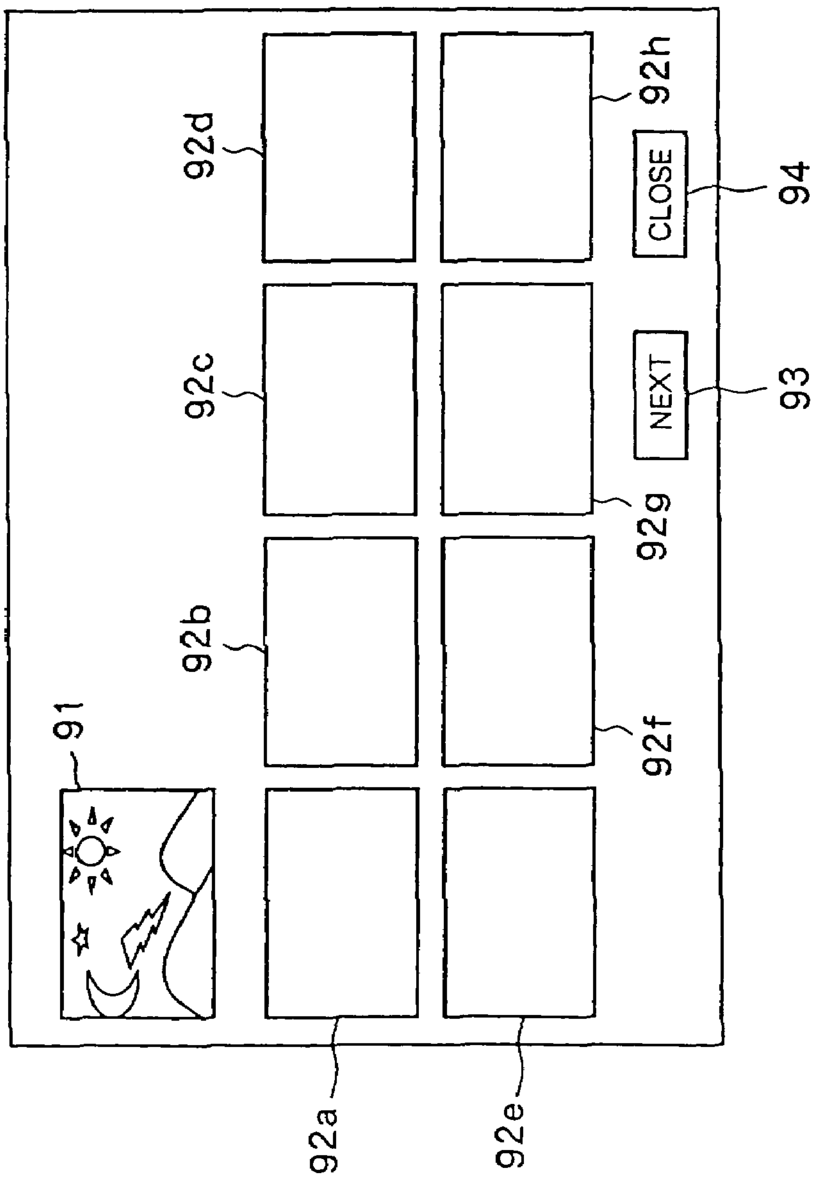
FIG. 9 is a view showing an operation window displayed on the display section 103 in step S24.

FIG. 9 is a view showing an operation window displayed on the display section 103 in step S24. The thumbnail image (reduced image) of the presented illustration is displayed in a region 91. The thumbnail images (reduced images) of similar images searched by the above processing are displayed in regions 92*a* to 92*h*. An image corresponding to an image number for the highest similarity, i.e., an image number stored in the array T(0) is displayed in the region 92*a*, an image corresponding to the array T(1) is displayed in the region 92*b*, . . . . An image having the lowest similarity h in these images is displayed in the region 29*h*. As a thumbnail image, image data stored in the hard disk can be decoded, reduced, and displayed on the window. It there is low-resolution image data for an icon, like Flashpix as a standard image format, that image data can be decoded and displayed. When a button 93 is pressed, the next candidates, i.e., images corresponding to arrays T(8) to T(15) are displayed in the regions 92*a* to 92*h* as thumbnail images. This can be repeated up to T(M−1). When the thumbnail image (or icon) of a candidate image is designated, details of a corresponding image (original image) are displayed. When a button 94 is pressed, step S24 is ended.

When the "central portion" is selected by the list button 39 shown in FIG. 3, similar search with a weight on the central portion of image data can be executed. When the "entire image" is selected, normal similar image search can be executed.

In this embodiment, as values set to the variable A, 100 is used as the value on the weighted side, and 25 is used on the other side. However, the present invention is not limited to this. Additionally, in this embodiment, two weight values "100" and "25" are used. However, more than two weight values may be used.

In this embodiment, an image is segmented into six regions, and two regions are defined as the central portion of the image. However, the present invention is not limited to this, and the central portion can be set in accordance with the number of segments or segmentation method.

For example, consider a searching of a photographic image database. Many photographic data generally have important "objects" at the central portions of the images. Hence, even when the user does not select the "central portion" by the button 38 shown in FIG. 3, processing with "importance on the center" may be executed in the search apparatus. That is, the mode of "importance on the center" may be set as a default state.

Second Embodiment

In the first embodiment, the region for calculation with a weight is permanently fixed. More specifically, when "importance on the center" is selected, weight "100" is set for the regions (1, 0) and (1, 1), and weight "25" is set for the remaining regions. However, the regions can be designated by the user. In the second embodiment, such a case will be described.

Figure 10:
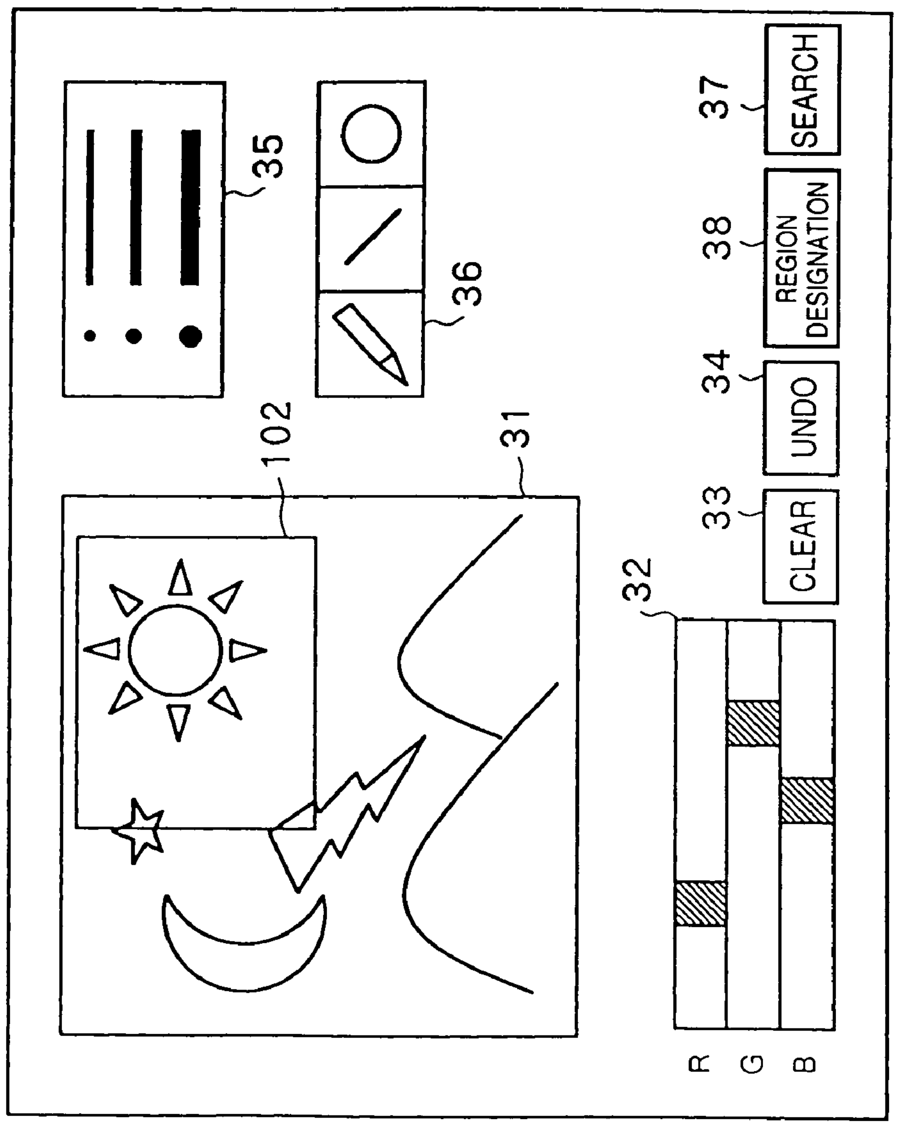
FIG. 10 is a view for explaining a window structure for interactive image presentation in the second embodiment.

As a user interface in this case, the set button 38 shown in FIG. 3 is changed to a region designation button 101, as shown in FIG. 10. When the region designation button 101 is pressed, a rectangular region 102 is displayed in a drawing region 31, as shown in FIG. 10. The position or size of this rectangular region 102 can be changed/designated by the user using a pointing device such as a mouse.

In inter-image distance calculation processing, when the rectangular region 102 is designated, it is determined in determination processing in step S73 of the flowchart shown in FIG. 7 whether the segmented region is included in the designated rectangular region 102. Thus, the user can designate a rectangular region having an arbitrary position and size as an "important region".

The region designated by the user is not limited to a rectangular region. In addition, the size of the rectangular region is not limited to the size of a segmented region in calculating the image feature amount. In this case, however, a segmented region may be partially included in the designated region. In such a case, control is performed to change the value of a variable A in accordance with the state of each segmented region (the ratio of the region belonging to the rectangular region to each segmented region), though the flow branches into two states upon determination processing in step S73 shown in FIG. 7.

Figure 11:
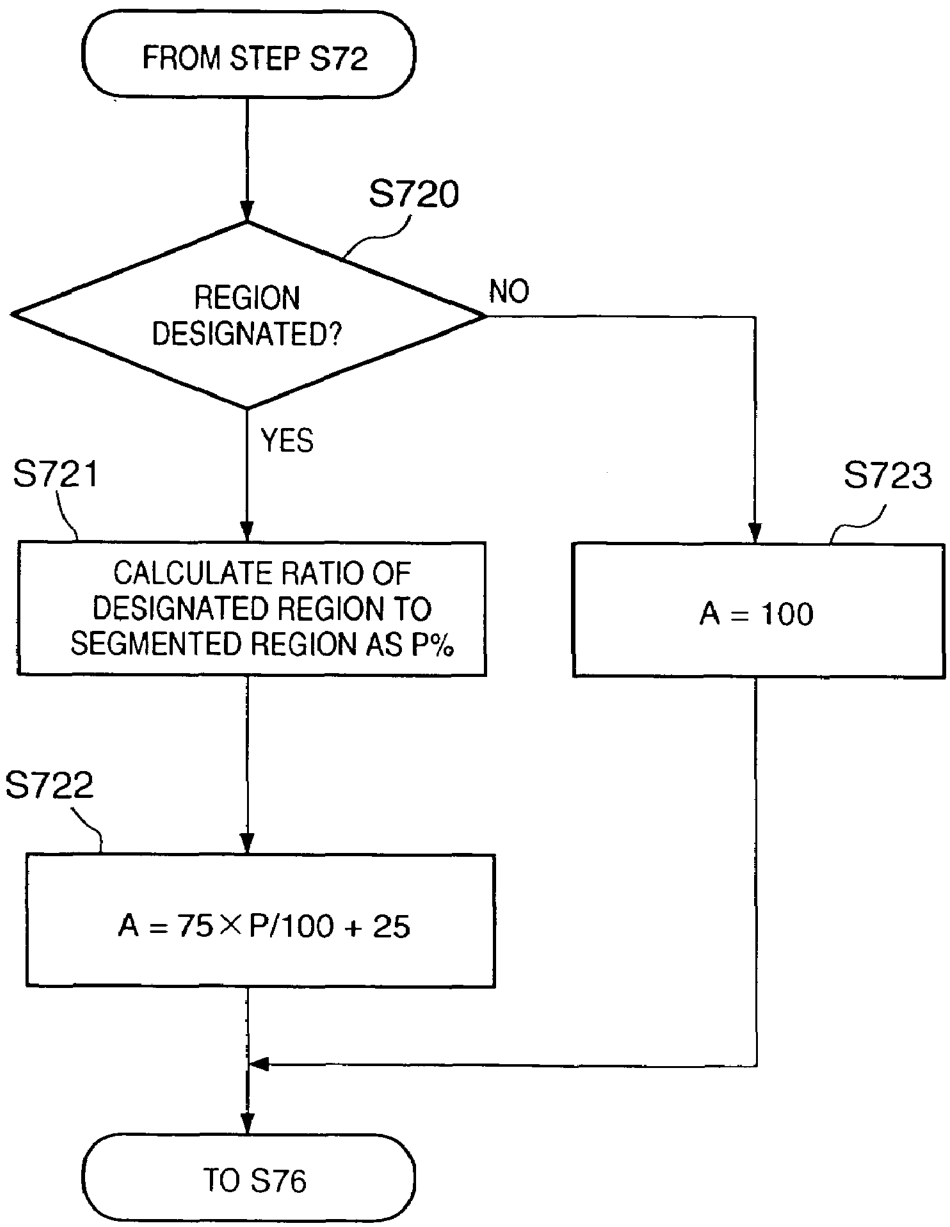
FIG. 11 is a flowchart showing weight setting processing according to the second embodiment.

For example, steps S73 to S75 in FIG. 7 are replaced with steps S720 to S723 in FIG. 11 to determine the weight A. More specifically, first, it is determined in step S720 whether a region is designated by the user. If NO in step S720, the flow advances to step S723 to set 100 to the value A and then to step S76. If YES in step S720, the flow advances from step S720 to S721 to calculate the ratio of the region designated by the user to the segmented region as P %. In step S722, $(75 \times P/100)+25$ is calculated, the obtained value is set to the value A, and the flow advances to step S76.

The layout of the operation window described in the above embodiments is not limited. Additionally, although a mouse has been exemplified above as a device used by the user to draw a sketch image, the present invention is not limited to this, and a pen tablet or touch panel may be used.

As described above, according to the first and second embodiments, the user draws an image similar to the desired image on the computer operation window, the database system segments the image into a plurality of regions, extracts the feature amounts in units of regions, and executes similar image search on the basis of the feature amounts. When similar image search is executed with a weight on, e.g., the central portion of the image or a region designated by the user in the plurality of segmented regions, more complex and advanced search is possible. Thus, an image searching interface capable of executing searching accurately reflecting the user's intention can be provided. Instead of remembering the entire image, the user sometimes partially remembers image data as, e.g., an "image having such a thing at a certain portion". In this case, by searching for the image while placing importance on the partial region, the well-remembered portion can be especially "thoroughly" searched. This is quite effective in similar image search using a manually drawn image as a search source image.

Third Embodiment

The third embodiment will be described next. In the above-described first and second embodiments, the weight used for similarity calculation is changed in accordance with the position in an image. In the third embodiment to be described below, the weight used for similarity calculation is changed in accordance with contents represented by feature amounts.

The arrangement of an image search apparatus and the schematic flow of image search processing in the third embodiment are the same as in the first embodiment (FIGS. 1 and 2). In the third embodiment, however, similar image search processing in step S23 is different from the first and second embodiments. The difference from the first and second embodiments will be mainly described below.

Figure 12:
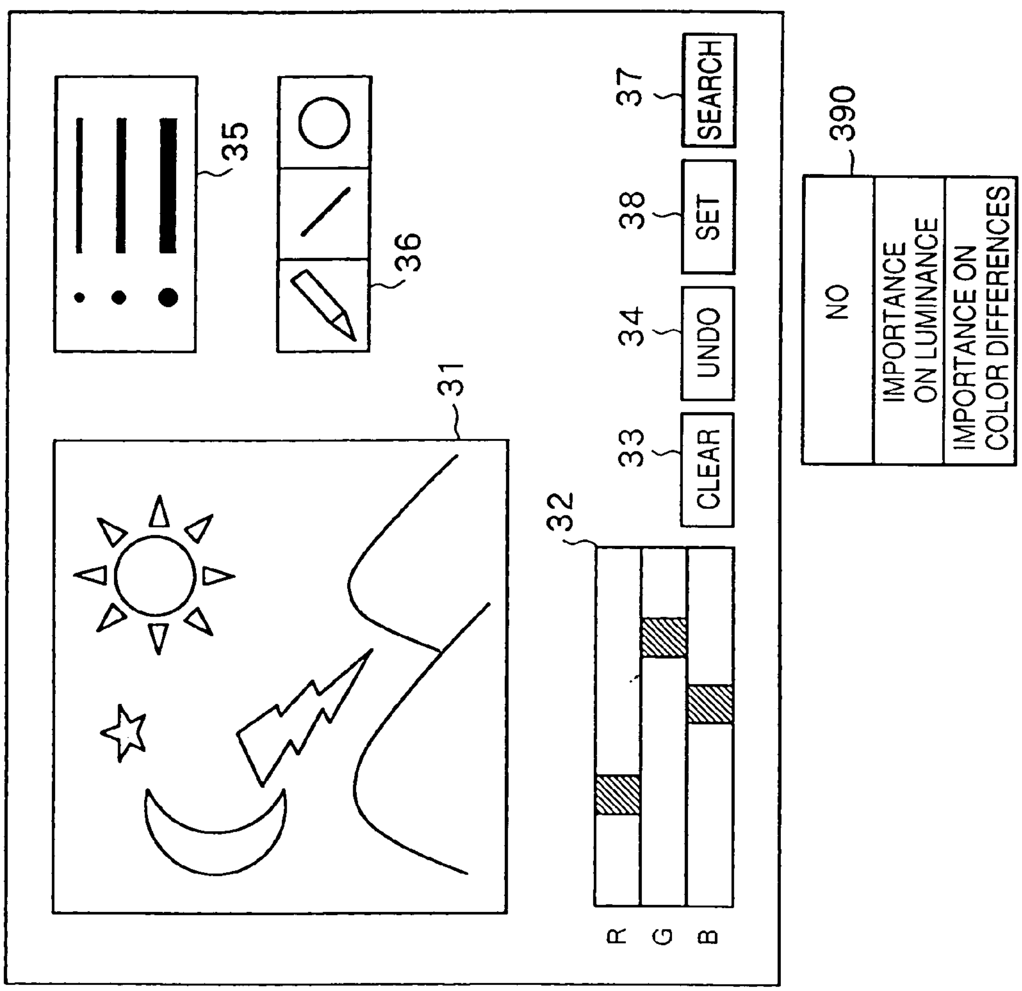
FIG. 12 is a view showing an operation window according to the third embodiment.

In step S21 shown in FIG. 2, a window shown in FIG. 12 is displayed, and the search source image can be drawn using the same drawing tools as in the first embodiment. FIG. 12 is a view showing the operation window displayed on a display section 103 in the third embodiment. This window is different from that of the first embodiment (FIG. 3) in a setting menu (390) displayed when a set button 38 is clicked.

As in the first embodiment, before pressing a search execution button 37, a condition for similar image search from step S22 can be changed by operating the set button 38. For similarity calculation in similar image search, "importance on luminance" or "importance on color differences" can be selected by pressing the set button 38. When the set button 38 is pressed, the setting menu 390 is displayed, so the user can select one of three conditions "importance on luminance", "importance on color differences", and "NO (importance)".

In step S22 shown in FIG. 2, the same image feature amount calculation as in the first embodiment (FIGS. 5 and 6) is executed, and the flow advances to step S23. Similar image search is executed in accordance with the processing procedure shown in FIG. 13.

Figure 13:
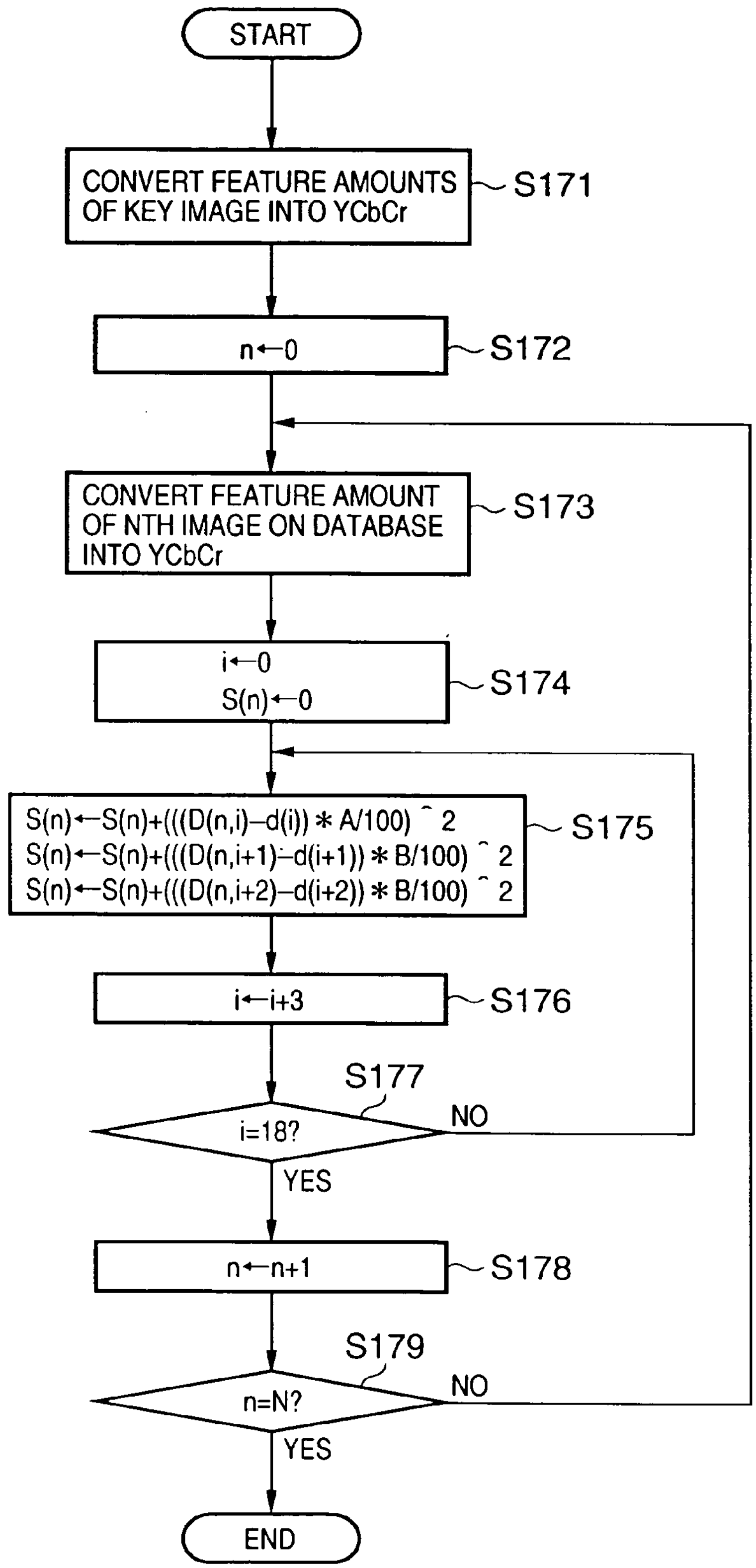
FIG. 13 is a flowchart showing inter-image distance calculation processing according to the third embodiment.

Before executing the flowchart in FIG. 13, variables A and B are set in accordance with the condition set by that shown in FIG. 12. For "NO", A=B=50 is set. When "importance on luminance" is selected, for example, A=75 and B=25 are set. When "importance on color differences" is selected, for example, A=25 and B=75 are set. The values A and B are used for inter-image distance calculation (to be described later) using feature amounts. Calculation with "importance on luminance" and that with "importance on color differences" are switched depending on the values A and B.

When the values A and B are set in the above way, in step S171, the feature amounts of the key image data are converted into a color space represented by the luminance and color differences. In this embodiment, the average values of R, G, and B values are converted into Y, Cb, and Cr values. This conversion is expressed by, e.g., $$Y = 0.29R + 0.587 + 0.114B$$

$$Cb = -0.1687R - 0.3323G + 0.5B + 128$$

$$Cr = 0.5R - 0.4187G - 0.0813B + 128$$

At this time, to save memory, the Y, Cb, and Cr values may be stored in the area where the average values of R, G, and B values have been stored. In step S172, a variable n is initialed to value "0". In step S173, the feature amounts of the nth image data stored in the image database are converted into Y, Cb, and Cr values, as in step S171. In step S174, variables i and S(n) are initialized to value "0".

In step S175, the square of the product of A/100 or B/100 and the difference between D(n, i) and d(i) is added to the value S(n). In this example, the luminance value (Y) is stored in D(n, i) and D(i), the color difference value (Cb) is stored in D(n, i+1) and d(i+1), and the color difference value (Cr) is stored in D(n, i+2) and d(i+2). Hence, (D(n, i)−d(i)) is multiplied by A/100, and (D(n, i+1)−d(i+1)) and (D(n, i+2)−d(i+2)) are multiplied by B/100.

In step S176, the variable i is incremented by three. In step S177, the variable i is compared with 18. If the two values equal, the flow advances to step S178; otherwise, the flow returns to step S175. In step S178, the variable n is incremented by one. In step S179, the variable n is compared with the value N. If the two values equal, the processing is ended; otherwise, the flow returns to step S173.

The inter-image distance between the presented image and each of all the stored images is stored in the array S(n) calculated in the above way. The inter-image distance is calculated with a weight corresponding to the "importance on luminance" or "importance on color differences", as described above. Next, the processing of selecting M images sequentially in ascending order of inter-image distances and storing their image numbers in an array T( ) is executed. This processing is the same as described above with reference to FIG. 8.

With the above processing, when the "importance on luminance" is selected by the setting menu 390 shown in FIG. 12, similar search with a weight on "luminance" can be executed. When the "importance on color differences" is selected, similar image search with a weight on "color difference" can be executed.

In this embodiment, as values set to the variables A and B, 75 is used as the value on the important side, and 25 is used on the other side. However, the present invention is not limited to this.

Fourth Embodiment

In the third embodiment, the values A and B used for calculation with a weight are permanently fixed. In the fourth embodiment, values A and B can be designated by the user.

Figure 14:
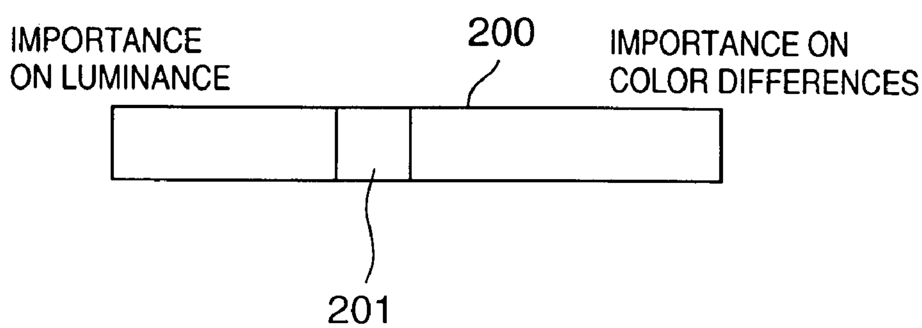
FIG. 14 is a view for explaining a window structure for interactive image presentation in the fourth embodiment.

In this case, instead of the setting menu 390 shown in FIG. 12, a scroll bar is used as a user interface, as shown in FIG. 14. Control is executed such that when a mark 201 is at the left end, calculation is performed with a weight on only the "luminance", when the mark 201 is at right end, calculation is performed with a weight on only the "color difference", and when the mark 201 is at the center, calculation is performed with the same weight on the "luminance" and "color difference". More specifically, in the fourth embodiment, the values A and B for weighted similar image search processing (FIG. 13) described in the third embodiment are controlled within the range of 0≦A<100 and 0≦B<100. For example, A=100 and B=0 at the left end, A=0 and B=100 at the right end, and A=B=50 at the intermediate position.

In the third and fourth embodiments, as the feature amounts of image data, the average values of the R, G, and B values are temporarily calculated and then converted into Y, Cb, and Cr values. However, the present invention is not limited to this, and the Y, Cb, and Cr values may be calculated from the beginning.

In addition, the layout of the operation window operated by the user is not limited to that of the above embodiments.

Further, although a mouse has been exemplified above as a device used by the user to draw a sketch image, the present invention is not limited to this, and a pen tablet or touch panel may be used.

As described above, in the third and fourth embodiments, a sketch pad is prepared on the computer operation window, the user draws an image similar to the desired image on the window, and the database system extracts the feature amounts from the image and executes similar image search on the basis of the feature amounts.

When similar image search is executed by generating luminance information and color difference information from the feature amounts of the image data and placing importance on the luminance or color difference, more complex search is possible. Thus, an image search interface capable of executing search while accurately reflecting the user's intention can be provided.

As described above, according to the third and fourth embodiments, for example, when "importance on luminance" is set, search can be executed mainly in consideration of "bright" or "dark" but not the chrominance information (color differences). For this reason, the ambiguity for image colors remembered by the user can be compensated, and effective image search can be executed. In some cases, the user remembers not "colors" but "shapes" well. In this case as well, a satisfactory result can be obtained by search with "importance on luminance".

According to the above embodiment, for example, when settings of the scroll bar shown in FIG. 14 are changed in various ways, many search conditions can be generated from a drawn image. Hence, the user need not redraw the key search image many times.

The present invention can be applied to a system constituted by a plurality of devices (e.g., a host computer, interface device, reader, and printer) or an apparatus constituted by a single device (e.g., a copying machine or facsimile apparatus).

The object of the present invention can also be achieved when a storage medium (or recording medium) storing software program codes for realizing the functions of the above-described embodiments is supplied to a system or apparatus, and the computer (or a CPU or an MPU) of the system or apparatus reads out and executes the program codes stored in the storage medium. In this case, the program codes read out from the storage medium realize the functions of the above-described embodiments by themselves, and the storage medium storing the program codes constitutes the present invention. The functions of the above-described embodiments are also realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion card inserted into the computer or a function expansion unit connected to the computer, and the CPU of the function expansion card or function expansion unit performs part or all of actual processing on the basis of the instructions of the program codes.

As many apparently widely different embodiments of the present invention can be made without departing from the spirit and scope thereof, it is to be understood that the invention is not limited to the specific embodiments thereof except as defined in the claims.

What is claimed is:

1. An image search method of searching for a desired image from a plurality of images stored in storage means, comprising:

a designation step of designating an arbitrary region in a search source image;

a segmenting step of segmenting the search source image into a plurality of segmented regions;

a first calculating step of calculating, for each segmented region of the plurality of segmented regions, a ratio of a region belonging to the designated arbitrary region to the segmented region;

a setting step of setting a weight value, for each segmented region of the plurality of segmented regions, corresponding to the ratio of each segmented region of the plurality of segmented regions calculated in the first calculating step;

a second calculation step of calculating image similarities between the search source image and each of the plurality of images stored in the storage means by comparing the plurality of segmented regions of the search source image and segmented regions of each of the plurality of images stored in the storage means using the weight values set in the setting step; and an acquisition step of acquiring an image as a search result from the plurality of images on the basis of the image similarities calculated in the second calculation step.

2. The method according to claim 1, wherein said method further comprises the drawing step of allowing an operator to interactively draw an image, and the search source image is the image drawn in the drawing step.

3. The method according to claim 1, wherein the second calculation step comprises a step of integrating the weighted similarities for the segmented regions to obtain one of the image similarities.

4. The method according to claim 1, further comprising a display step of displaying on a display screen an image representing the image acquired in the acquisition step as the search result.

5. The method according to claim 4, wherein the display step comprises displaying a thumbnail image of the image acquired in the acquisition step.

6. The method according to claim 4, wherein the display step comprises displaying an icon image corresponding to the image acquired in the acquisition step.

7. The method according to claim 4, wherein the display comprises, when one of displayed images is selected, displaying details of an image linked to the image.

8. The method according to claim 4, wherein the display step comprises displaying extracted images in an order of similarities.

9. An image search apparatus for searching for a desired image from a plurality of images stored in storage means, comprising:

a designating means for designating an arbitrary region in a search source image;

a segmenting means for segmenting the search source image into a plurality of segmented regions;

a first calculating means for calculating, for each segmented region of the plurality of segmented regions, a ratio of a region belonging to the designated arbitrary region to the segmented region;

a setting means for setting a weight value, for each segmented region of the plurality of segmented regions, corresponding to the ratio of each segmented region of the plurality of segmented regions calculated by the first calculating means;

a second calculation means for calculating image similarities between the search source image and each of the plurality of images stored in the storage means by comparing the plurality of segmented regions of the search source image and segmented regions of each of the plurality of images stored in the storage means using the weighted values set by the setting means; and an acquisition means for acquiring an image as a search result from the plurality of images on the basis of the image similarities calculated by said second calculation means.

10. The apparatus according to claim 9, wherein said apparatus further comprises drawing means for allowing an operator to interactively draw an image, and the search source image is the image drawn by said drawing means.

11. The apparatus according to claim 9, wherein said second calculation means integrates the weighted similarities for the segmented regions to obtain one of the image similarities.

12. The apparatus according to claim 9, further comprising display means for displaying on a display screen an image representing the image acquired by said acquisition means as the search result.

13. The apparatus according to claim 12, wherein said display means displays a thumbnail image of the image acquired by said acquisition means.

14. The apparatus according to claim 12, wherein said display means displays an icon image corresponding to the image acquired by said acquisition means.

15. The apparatus according to claim 12, wherein when one of displayed images is selected, said display means displays details of an image linked to the image.

16. The apparatus according to claim 12, wherein said display means displays extracted images in an order of similarities.

17. A computer readable medium which stores a control program for causing a computer to realize processing of searching for a desired image from a plurality of images stored in storage means, said control program comprising:

a code of a designating step of designating an arbitrary region in a search source image;

a code of a segmenting step of segmenting the search source image into a plurality of segmented regions;

a code of a first calculating step of calculating, for each segmented region of the plurality of segmented regions, a ratio of a region belonging to the designated arbitrary region to the segmented region;

a code of a setting step of setting a weight value, for each segmented region of the plurality of segmented regions based, corresponding to the ratio of each segmented region of the plurality of segmented regions calculated in the first calculating step;

a code of a second calculation step of calculating image similarities between the search source image and each of the plurality of images stored in the storage means by comparing the plurality of segmented regions of the search source image and segmented regions of each of the plurality of images stored in the storage means using the weight values set in the setting step; and a code of an acquisition step of acquiring an image as a search result from the plurality of images on the basis of the image similarities calculated in the second calculation step.

18. An image search apparatus for searching for a desired image from a plurality of images stored in a storage unit, comprising:

a designation unit configured to designate an arbitrary region in a search source image;

a segmenting unit configured to segment the search source image into a plurality of segmented regions;

a first calculating unit configured to calculate, for each segmented region of the plurality of segmented regions, a ratio of a region belonging to the designated arbitrary region to the segmented region;

a setting unit configured to set a weight value, for each segmented region of the plurality of segmented regions, corresponding to the ratio of each segmented region of the plurality of segmented regions calculated by the first calculating unit;

a second calculation unit configured to calculate image similarities between the search source image and each of the plurality of images stored in the storage unit by comparing the plurality of segmented regions of the search source image and segmented regions of each of the plurality of images stored in the storage unit using the weighted values set in the setting unit; and an acquisition unit configured to acquire an image as a search result from the plurality of images on the basis of the image similarities calculated by said second calculation unit.

* * * * *

UNITED STATES PATENT AND TRADEMARK OFFICE

CERTIFICATE OF CORRECTION

PATENT NO. : 6,999,636 B1
APPLICATION NO. : 09/707050
DATED : February 14, 2006
INVENTOR(S) : Miyuki Enokida et al.

It is certified that error appears in the above-identified patent and that said Letters Patent is hereby corrected as shown below:

Column 7, line 55, delete “a searching of” and insert --a search of--

Signed and Sealed this

Twenty-first Day of November, 2006

JON W. DUDAS
*Director of the United States Patent and Trademark Office*